(12) United States Patent
Hashimoto et al.

(10) Patent No.: US 10,604,912 B2
(45) Date of Patent: Mar. 31, 2020

(54) CONTROL SYSTEM FOR WORK VEHICLE, CONTROL METHOD, AND WORK VEHICLE

(71) Applicant: KOMATSU LTD., Tokyo (JP)

(72) Inventors: Kazuhiro Hashimoto, Hirakata (JP); Kenjiro Shimada, Hirakata (JP); Kota Beppu, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 125 days.

(21) Appl. No.: 15/658,922

(22) Filed: Jul. 25, 2017

(65) Prior Publication Data

US 2018/0038070 A1 Feb. 8, 2018

(30) Foreign Application Priority Data

Aug. 2, 2016 (JP) .................................. 2016-152265

(51) Int. Cl.
*E02F 9/20* (2006.01)
*G05D 1/02* (2020.01)
*E02F 9/26* (2006.01)
*E02F 3/84* (2006.01)
(Continued)

(52) U.S. Cl.
CPC .............. *E02F 9/205* (2013.01); *E02F 3/847* (2013.01); *E02F 9/262* (2013.01); *G05D 1/0274* (2013.01); *G01C 15/002* (2013.01); *G05D 3/12* (2013.01); *G05D 2201/0202* (2013.01)

(58) Field of Classification Search
CPC . E02F 3/434; E02F 3/841; E02F 3/842; E02F 3/844; E02F 3/847; E02F 9/2025; E02F 9/2029; E02F 9/2041; E02F 9/2045; E02F 9/205; E02F 9/262; G05D 1/0274;
(Continued)

(56) References Cited

U.S. PATENT DOCUMENTS

| 6,085,583 A | * | 7/2000 | Cannon | E02F 3/435 37/413 |
| 6,167,336 A | * | 12/2000 | Singh | E02F 3/434 172/2 |
| 10,066,367 B1 | * | 9/2018 | Wang | E02F 9/2029 |
| 2008/0082238 A1 | * | 4/2008 | Mannepalli | E02F 3/842 701/50 |

(Continued)

FOREIGN PATENT DOCUMENTS

| JP | 2000291076 A | * | 10/2000 |
| JP | 5247939 B1 | | 4/2013 |

*Primary Examiner* — Faris S Almatrahi
*Assistant Examiner* — David A Testardi
(74) *Attorney, Agent, or Firm* — Global IP Counselors, LLP

(57) ABSTRACT

A current terrain acquisition device acquires current terrain information indicating a current terrain to be worked. A controller is configured to generate an inclined virtual surface extending from a current position of the work vehicle. The controller is configured to decide an estimated held soil volume of a work implement of the work vehicle when the work implement is moved along the virtual surface in the current terrain. The controller is configured to decide whether the estimated held soil volume has reached a predetermined held soil volume threshold. The controller is configured to set the virtual surface extending from the current position of the work vehicle when the estimated held soil volume has reached the held soil volume threshold as a first virtual design surface, and generate a command signal to the work implement to move the work implement along the virtual design surface.

14 Claims, 15 Drawing Sheets

(51) Int. Cl.
*G01C 15/00* (2006.01)
*G05D 3/12* (2006.01)

(58) Field of Classification Search
CPC .......... G05D 2201/0202; E01C 19/004; G06Q 50/08
See application file for complete search history.

(56) References Cited

U.S. PATENT DOCUMENTS

| | | | |
|---|---|---|---|
| 2012/0136508 A1* | 5/2012 | Taylor | E02F 9/2045 701/2 |
| 2013/0006484 A1* | 1/2013 | Avitzur | E02F 9/205 701/50 |
| 2013/0081831 A1 | 4/2013 | Hayashi | |
| 2013/0311031 A1* | 11/2013 | Friend | G05D 1/0278 701/26 |
| 2014/0012404 A1* | 1/2014 | Taylor | G06F 17/5004 700/97 |
| 2014/0174770 A1* | 6/2014 | Wei | E02F 3/841 172/2 |
| 2014/0180548 A1* | 6/2014 | Edara | G05B 13/024 701/50 |
| 2016/0040392 A1* | 2/2016 | Kontz | E02F 3/841 700/275 |
| 2016/0076222 A1* | 3/2016 | Taylor | E01C 19/004 701/50 |
| 2016/0077513 A1* | 3/2016 | Wei | G05D 1/0217 700/114 |
| 2016/0077514 A1* | 3/2016 | Taylor | E01C 19/004 700/173 |
| 2016/0343095 A1* | 11/2016 | Wei | G06Q 10/06398 |
| 2018/0038067 A1* | 2/2018 | Hashimoto | E02F 3/847 |
| 2018/0038068 A1* | 2/2018 | Hashimoto | E02F 3/847 |
| 2018/0038069 A1* | 2/2018 | Hashimoto | E02F 3/847 |
| 2018/0038082 A1* | 2/2018 | Hashimoto | E02F 3/7609 |

\* cited by examiner

CONTROL SYSTEM FOR WORK VEHICLE, CONTROL METHOD, AND WORK VEHICLE

CROSS-REFERENCE TO RELATED APPLICATIONS

This application claims priority to Japanese Patent Application No. 2016-152265 filed on Aug. 2, 2016, the disclosure of which is hereby incorporated herein by reference in its entirety.

TECHNICAL FIELD

The present invention relates to a control system for a work vehicle, to a control method, and to a work vehicle.

BACKGROUND

A control system has been proposed in the past in which the position of a work implement is automatically adjusted in a work vehicle such as a bulldozer or a grader. For example, Japanese Patent No. 5,247,939 discloses digging control and grading control. In digging control, the position of the blade is automatically adjusted so that the load on the blade will match a target load. In grading control, the position of the blade is automatically adjusted so that the cutting edge of the blade moves along a design terrain indicating the target shape to be dug.

SUMMARY

With the above-mentioned conventional control system, the occurrence of shoe slip can be minimized by raising the work implement when the load on the work implement becomes excessive. This allows the work to be performed more efficiently.

With a conventional control system, however, as shown in FIG. 15, first the work implement is controlled so as to follow the design terrain 100 by grading control. If the load on the work implement subsequently increases, the work implement is raised by load control (see the trajectory 200 of the work implement in FIG. 15). Therefore, when digging a terrain 300 with large undulations, the load exerted on the work implement may increase rapidly, causing the work implement to rise suddenly. If that happens, a very uneven terrain will be formed, making it difficult to perform digging work smoothly. Also, there is the risk that the terrain being dug will be prone to becoming rough and the finish quality will suffer.

It is an object of the present invention to provide a control system for a work vehicle, a control method, and a work vehicle, with which digging work can be performed efficiently and with good finish quality.

The control system according to a first aspect is a work vehicle control system that includes a current terrain acquisition device and a controller. The current terrain acquisition device acquires terrain information indicating the current terrain to be worked. The controller is configured to decide an inclined virtual surface extending from the current position of the work vehicle. The controller is configured to decide the estimated held soil volume of a work implement of the work vehicle when the work implement is moved along the virtual surface in the current terrain. The controller is configured to decide whether the estimated held soil volume has reached a predetermined held soil volume threshold. The controller is configured to set the virtual surface extending from the current position of the work vehicle when the estimated held soil volume has reached the held soil volume threshold as a virtual design surface, and generate a command signal to the work implement to move the work implement along the virtual design surface.

The method for controlling a work vehicle according to a second aspect includes the following steps. In the first step, current terrain information indicating the current terrain to be worked is acquired. In the second step, the current position of the work vehicle is acquired. In the third step, an inclined virtual surface extending from the current position of the work vehicle is generated. In the fourth step, the estimated held soil volume of a work implement of the work vehicle when the work implement is moved along the virtual surface is decided. In the fifth step, the generation of a virtual surface and decision of the estimated held soil volume are repeatedly performed while moving the work vehicle, and it is determined whether the estimated held soil volume has reached a predetermined held soil volume threshold. In the sixth step, the virtual surface at the position of the work vehicle when the estimated held soil volume reaches the held soil volume threshold is set as a virtual design surface and movement of the work implement along the virtual design surface is started.

The work vehicle according to a third aspect includes a work implement and a controller. The controller is configured to decide an inclined virtual surface extending from the current position of the work vehicle. The controller is configured to decide the estimated held soil volume of the work implement when the work implement is moved along the virtual surface in the current terrain to be worked. The controller is configured to set the virtual surface extending from the current position of the work vehicle when the estimated held soil volume has reached a predetermined held soil volume threshold as a virtual design surface, and move the work implement along the virtual design surface.

DETAILED DESCRIPTION

Figure 1:
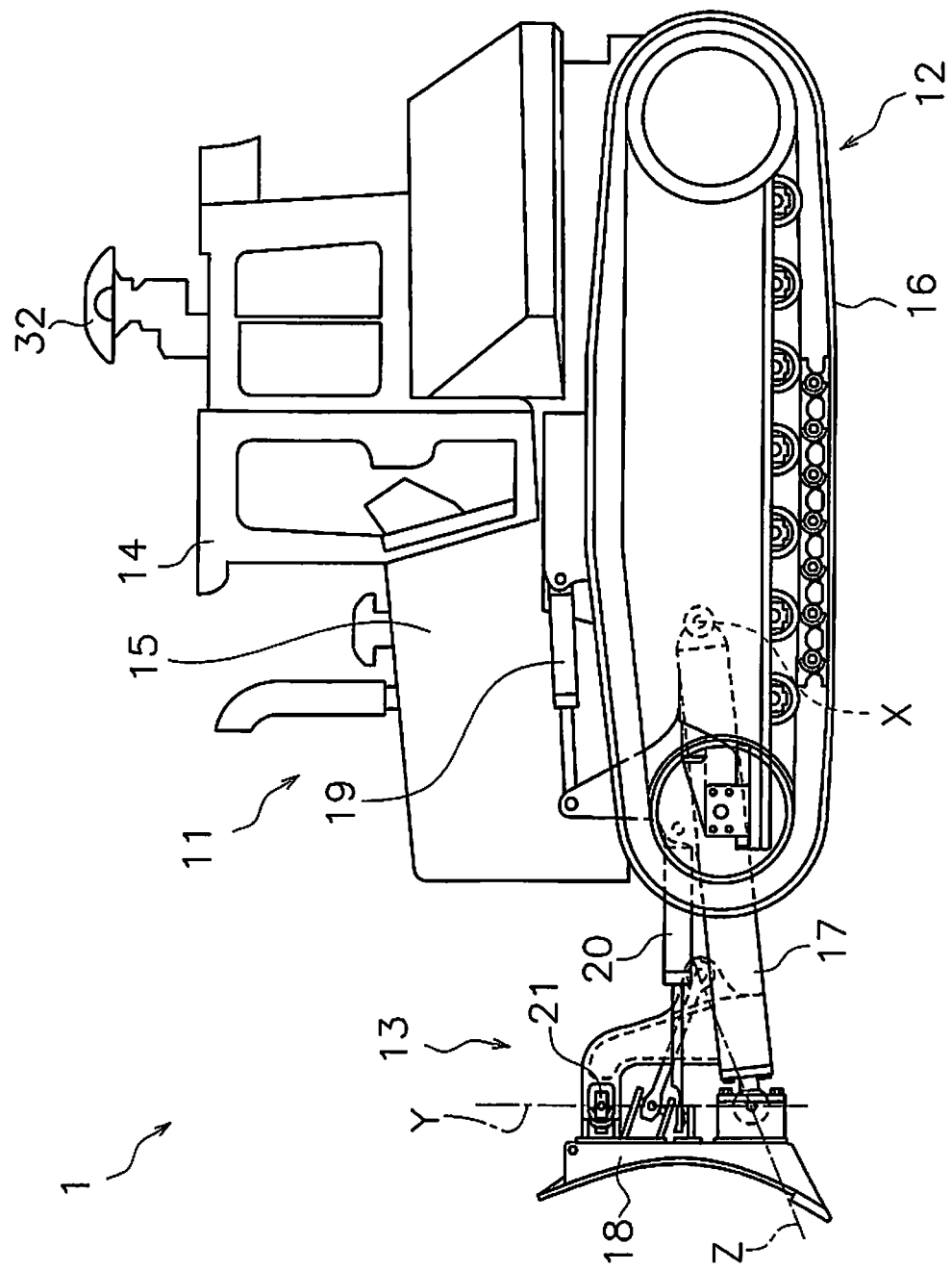
FIG. 1 is a side view of a work vehicle according to an embodiment.

The work vehicle according to an embodiment will now be described through reference to the drawings. FIG. 1 is a side view of a work vehicle 1 according to an embodiment. The work vehicle 1 according to this embodiment is a bulldozer. The work vehicle 1 includes a vehicle body 11, a drive unit 12, and a work implement 13.

The vehicle body 11 has a cab 14 and an engine compartment 15. A driver's seat (not shown) is disposed in the cab 14. The engine compartment 15 is disposed in front of the cab 14. The drive unit 12 is attached to a lower portion of the vehicle body 11. The drive unit 12 has a pair of right and left crawler belts 16. Only the left crawler belt 16 is shown in FIG. 1. Rotation of the crawler belts 16 propels the work vehicle 1. The travel of the work vehicle 1 may be either autonomous travel, semi-autonomous travel, or travel under operation by the operator.

The work implement 13 is attached to the vehicle body 11. The work implement 13 has a lift frame 17, a blade 18, a lift cylinder 19, an angle cylinder 20, and a tilt cylinder 21.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is linked to the vehicle body 11 and the lift frame 17. As the lift cylinder 19 expands and contracts, the lift frame 17 rotates up and down around the axis X.

The angle cylinder 20 is linked to the lift frame 17 and the blade 18. As the angle cylinder 20 telescopes in and out, the blade 18 rotates around the axis Y extending in the approximate up and down direction.

The tilt cylinder 21 is linked to the lift frame 17 and the blade 18. As the tilt cylinder 21 expands and contracts, the blade 18 rotates around the axis Z extending in the approximate longitudinal direction of the vehicle.

Figure 2:
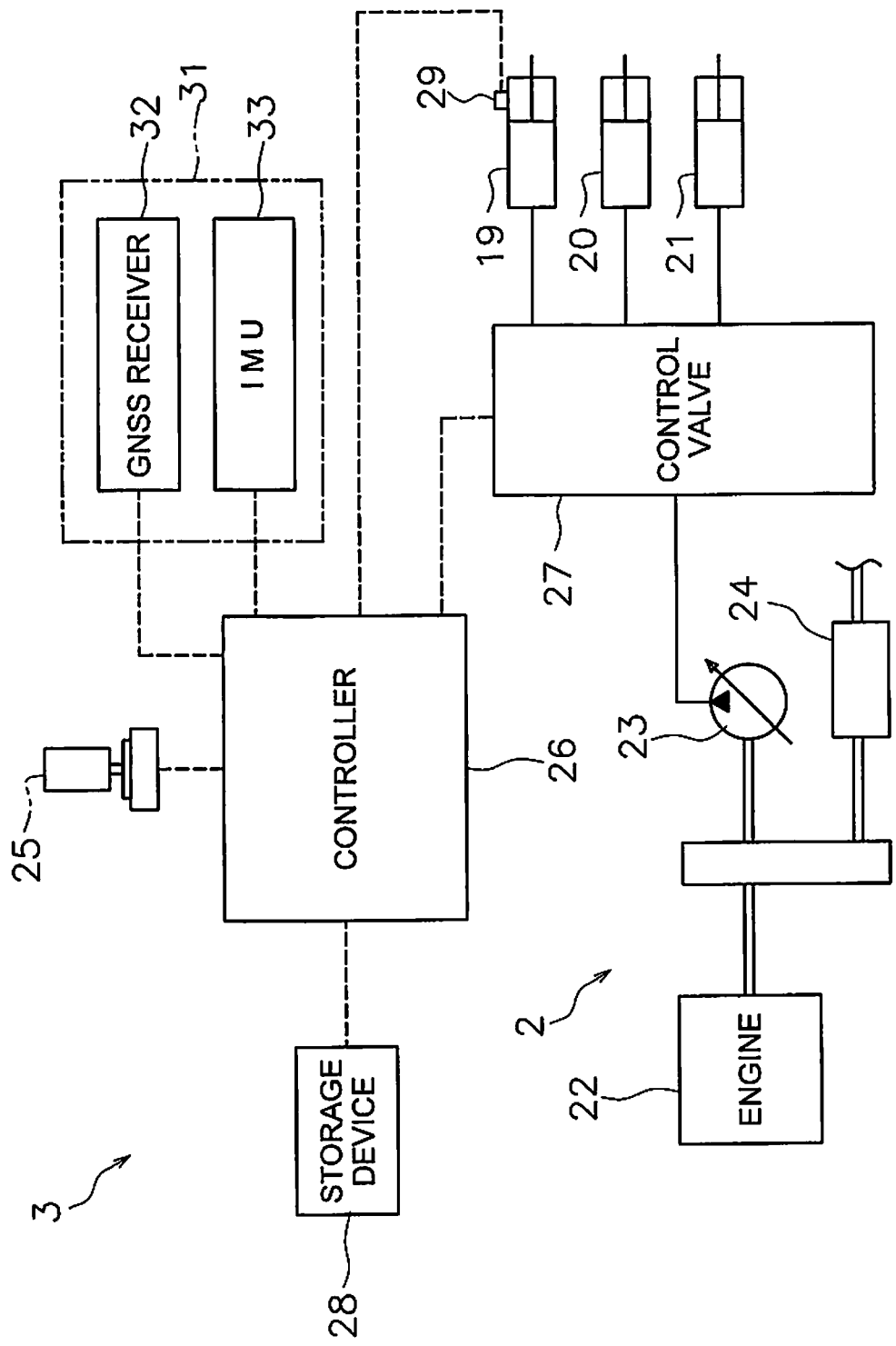
FIG. 2 is a block diagram of the configuration of the drive system and control system of the work vehicle.

FIG. 2 is a block diagram of the configuration of the drive system 2 and the control system 3 of the work vehicle 1. As shown in FIG. 2, the drive system 2 includes an engine 22, a hydraulic pump 23, and a power transmission device 24.

The hydraulic pump 23 is driven by the engine 22 and discharges hydraulic fluid. The hydraulic fluid discharged from the hydraulic pump 23 is supplied to the lift cylinder 19, the angle cylinder 20, and the tilt cylinder 21. In FIG. 2, just one hydraulic pump 23 is shown, but a plurality of hydraulic pumps may be provided.

The power transmission device 24 transmits the drive force of the engine 22 to the drive unit 12. The power transmission device 24 may be, for example, a hydro-static transmission (HST). Alternatively, the power transmission device 24 may be, for example, a torque converter or a transmission having a plurality of gears.

The control system 3 includes an operating device 25, a controller 26, and a control valve 27. The operating device 25 is used to operate the work implement 13 and the drive unit 12. The operating device 25 is disposed in the cab 14. The operating device 25 receives operator inputs for driving the work implement 13 and the drive unit 12, and outputs an operation signal corresponding to the input. The operating device 25 includes, for example, a control lever, a pedal, a switch, or the like.

For example, the operating device 25 for the drive unit 12 is provided to allow for operation in a forward position, a reverse position, and a neutral position. When the operation position of the operating device 25 is the forward position, the drive unit 12 or the power transmission device 24 is controlled so that the work vehicle 1 moves forward. When the operation position of the operating device 25 is the reverse position, the drive unit 12 or the power transmission device 24 is controlled so that the work vehicle 1 reverses.

The controller 26 is programmed to control the work vehicle 1 on the basis of acquired information. The controller 26 includes a processor such as a CPU, for example. The controller 26 acquires an operation signal from the operating device 25. The controller 26 controls the control valve 27 on the basis of the operation signal. The controller 26 is not limited to a single unit, and may be divided up into a plurality of controllers.

The control valve 27 is a proportional control valve and is controlled by a command signal from the controller 26. The control valve 27 is disposed between the hydraulic pump 23 and hydraulic actuators such as the lift cylinder 19, the angle cylinder 20, and the tilt cylinder 21. The control valve 27 controls the flow of hydraulic fluid supplied from the hydraulic pump 23 to the lift cylinder 19, the angle cylinder 20, and the tilt cylinder 21. The controller 26 generates a command signal to the control valve 27 so that the work implement 13 operates in accordance with the operation of the operating device 25 discussed above. Consequently, the lift cylinder 19, the angle cylinder 20, and the tilt cylinder 21 are controlled according to the operation amount of the operating device 25. The control valve 27 may be a pressure proportional control valve. Alternatively, the control valve 27 may be an electromagnetic proportional control valve.

Figure 3:
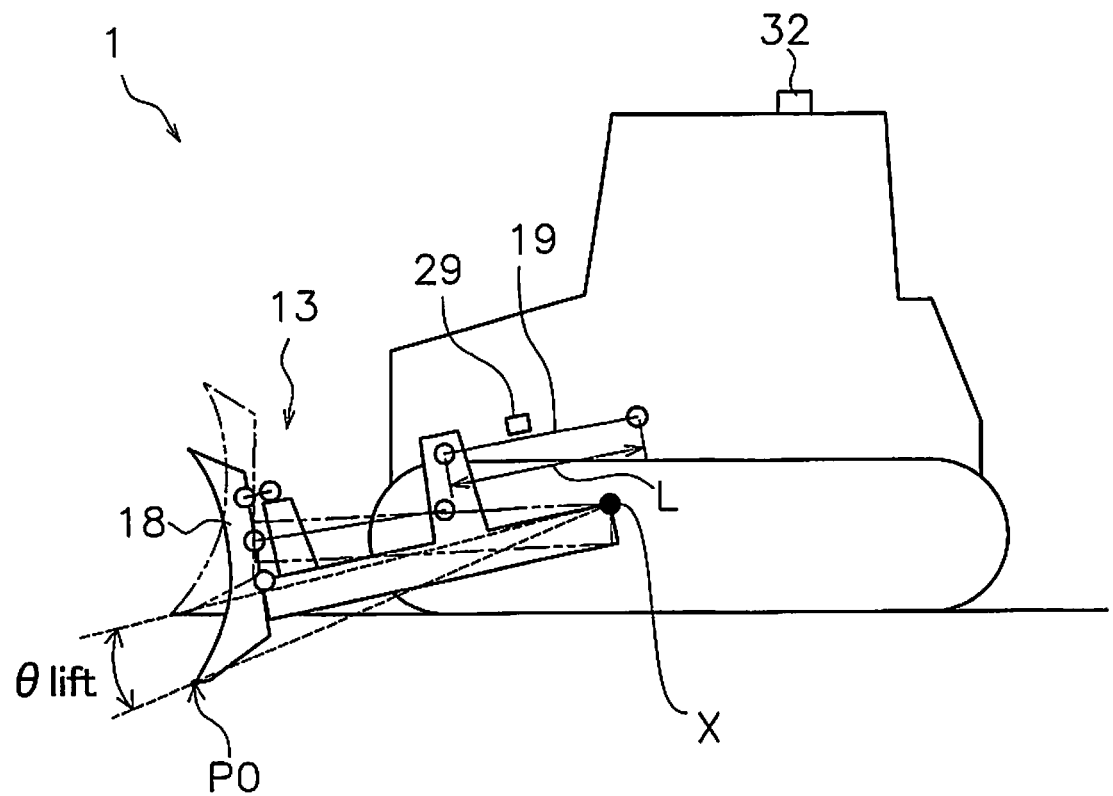
FIG. 3 is a simplified diagram of the configuration of the work vehicle.

The control system 3 includes a lift cylinder sensor 29. The lift cylinder sensor 29 senses the stroke length of the lift cylinder 19 (hereinafter referred to as "lift cylinder length L"). As shown in FIG. 3, the controller 26 calculates the lift angle θlift of the blade 18 on the basis of the lift cylinder length L. FIG. 3 is a simplified diagram of the configuration of the work vehicle 1.

In FIG. 3, the origin position of the work implement 13 is indicated by a two-dot chain line. The origin position of the work implement 13 is the position of the blade 18 in a state in which the cutting edge of the blade 18 is in contact with the ground on a horizontal surface. The lift angle θlift is the angle from the origin position of the work implement 13.

As shown in FIG. 2, the control system 3 includes a position sensing device 31. The position sensing device 31 measures the position of the work vehicle 1. The position sensing device 31 is the main body of a current terrain acquisition device (discussed below). The position sensing device 31 includes a GNSS (global navigation satellite system) receiver 32 and an IMU 33. The GNSS receiver 32 is, for example, a GPS (global positioning system) receiver and an antenna. The antenna of the GNSS receiver 32 is disposed on the cab 14. The GNSS receiver 32 receives positioning signals from a satellite and calculates the position of the antenna based on the positioning signal to generate vehicle position information. The GNSS receiver 32 sends the controller 26 a vehicle position signal indicating the position of the work vehicle 1. The controller 26 acquires vehicle position information from the GNSS receiver 32.

The IMU 33 is an inertial measurement unit. The IMU 33 acquires vehicle inclination angle information and vehicle acceleration information. The vehicle inclination angle information indicates the angle of the vehicle longitudinal direction with respect to the horizontal (pitch angle), and the angle of the vehicle lateral direction with respect to the horizontal (roll angle). The vehicle acceleration information indicates travel direction information about the work vehicle 1. The IMU 33 sends the controller 26 a vehicle inclination angle signal indicating the attitude of the work vehicle 1, and a vehicle acceleration signal indicating the travel direction. The controller 26 acquires vehicle inclination angle information and vehicle acceleration information from the IMU 33.

The controller 26 calculates a cutting edge position P0 from the lift cylinder length L, the vehicle position information, and the vehicle inclination angle information. As shown in FIG. 3, the controller 26 calculates the global coordinates of the GNSS receiver 32 based on the vehicle position information. The controller 26 calculates the lift angle θlift based on the lift cylinder length L. The controller 26 calculates the local coordinates of the cutting edge position P0 with respect to the GNSS receiver 32 based on the lift angle θlift and vehicle size information. The controller 26 calculates the travel direction of the work vehicle 1 from the vehicle acceleration information. The vehicle size information is stored in the storage device 28 and indicates the position of the work implement 13 with respect to the GNSS receiver 32. The controller 26 calculates the global coordinates of the cutting edge position P0 based on the global coordinates of the GNSS receiver 32, the local coordinates of the cutting edge position P0, and the vehicle inclination angle information. The controller 26 acquires the global coordinates of the cutting edge position P0 as cutting edge position information.

The control system 3 includes a storage device 28. The storage device 28 includes, for example, a memory and an auxiliary storage device. The storage device 28 may be, for example, a RAM, a ROM, or the like. The storage device 28 may be a semiconductor memory, a hard disk, or the like.

The storage device 28 stores design terrain information and work site terrain information. The design terrain information indicates the position and shape of the final design terrain. The final design terrain is the target terrain to be worked at the work site. The design terrain information is, for example, a construction drawing in a three-dimensional data format. The work site terrain information is the current terrain information for the work site around the work vehicle 1. The work site terrain information is, for example, a current topographical survey in a three-dimensional data format, which can be obtained by aerial laser survey. The controller 26 acquires the current terrain information. The current terrain information indicates the position and shape of the current terrain to be worked at the work site. The current terrain to be worked is the terrain of the region along the travel direction of the work vehicle 1. The current terrain information is acquired by calculation in the controller 26 from the work site terrain information and the position and travel direction of the work vehicle 1 obtained from the above-mentioned position sensing device 31. The controller 26 automatically controls the work implement 13 on the basis of the current terrain information, the design terrain information, and the cutting edge position information.

The automatic control of the work implement 13 may be semi-automatic control performed together with manual operation by the operator. Alternatively, the automatic control of the work implement 13 may be fully automatic control performed without any manual operation by an operator.

Figure 4:
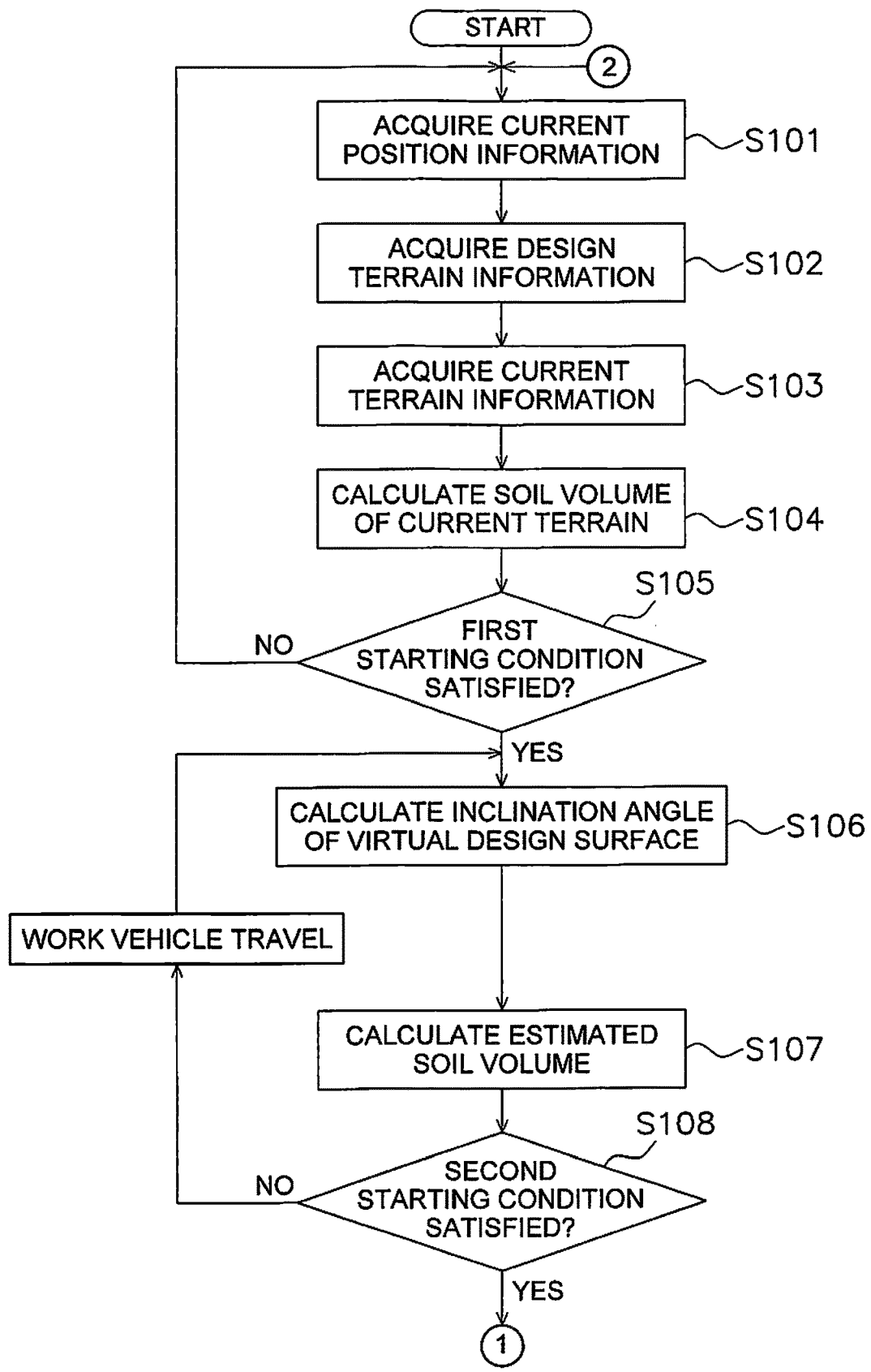
FIG. 4 is a flowchart of the processing involved in automatic control of a work implement in digging work.

The automatic control of the work implement 13 in digging work executed by the controller 26 will now be described. FIG. 4 is a flowchart of the processing involved in automatic control of the work implement 13 in digging work.

As shown in FIG. 4, in step S101, the controller 26 acquires current position information. Here, the controller 26 acquires the current cutting edge position P0 of the work implement 13 as discussed above.

Figure 5:
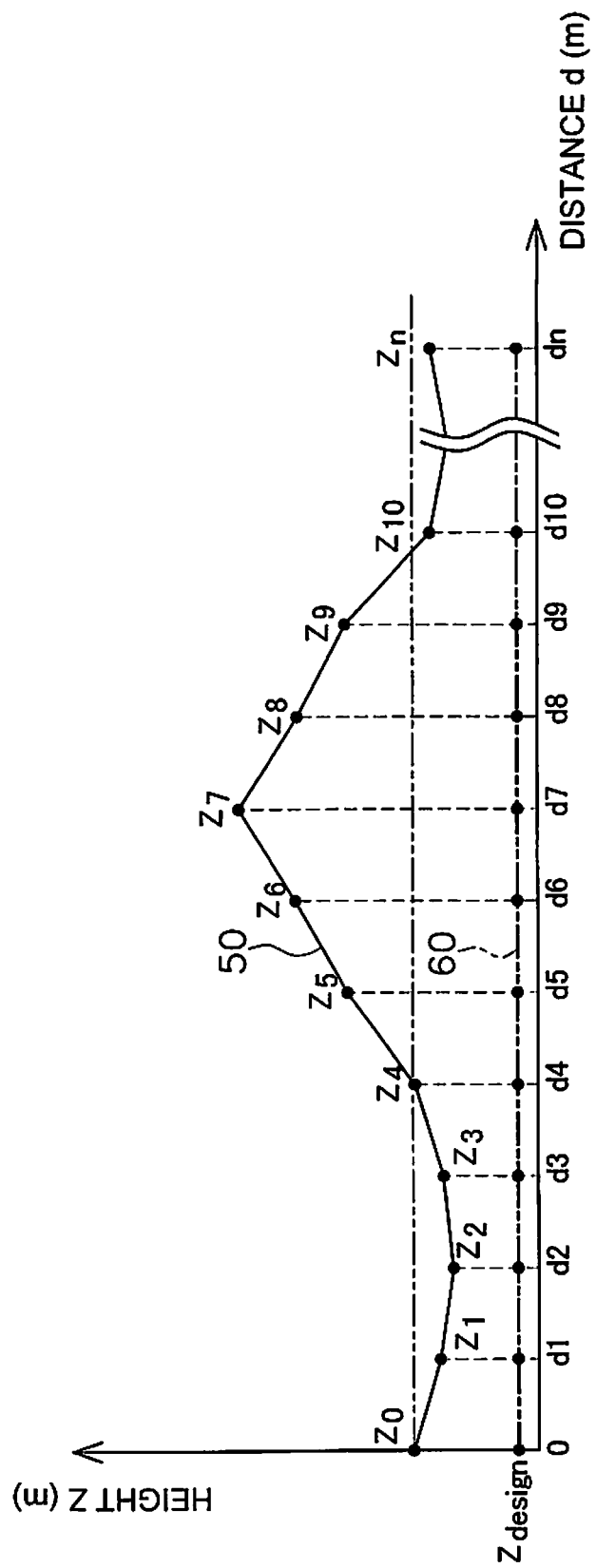
FIG. 5 is a diagram showing an example of the final design terrain and the current terrain.

In step S102, the controller 26 acquires design terrain information. As shown in FIG. 5, the design terrain information includes the height $Z_{design}$ of the final design terrain 60 at a plurality of points at predetermined intervals in the travel direction of the work vehicle 1. In FIG. 5, the final designed terrain 60 has a flat shape parallel to the horizontal direction, but it may have a different shape.

In step S103, the controller 26 acquires the current terrain information. The controller 26 acquires the current terrain information by calculation from the work site terrain information obtained from the storage device 28, and the vehicle position information and the travel direction information obtained from the position sensing device 31. The current terrain acquisition device includes the position sensing device 31 and the controller 26. The current terrain information is information about the terrain located in the travel direction of the work vehicle 1. FIG. 5 is a cross section of the current terrain 50. In FIG. 5, the vertical axis is the height of the terrain, and the horizontal axis is the distance from the current position in the travel direction of the work vehicle 1.

More precisely, the current terrain information includes the heights Z0 to Zn of the current terrain 50 at a plurality of points up to a predetermined terrain recognition distance d0 from the current position in the travel direction of the work vehicle 1. In this embodiment, the current position is a position determined on the basis of the current cutting edge position P0 of the work vehicle 1. However, the current position may be determined on the basis of the current position of another part of the work vehicle 1. The plurality of points are arranged at predetermined intervals, such as every meter.

The controller 26 acquires position information indicating the latest trajectory of the cutting edge position P0 as work site terrain information. The work site terrain information stored in the storage device 28 is updated with the acquired work site terrain information. Therefore, the position sensing device 31 functions as a terrain information acquisition device that acquires the latest terrain information.

Alternatively, the controller 26 may calculate the position of the bottom face of the crawler belt 16 from vehicle position information and vehicle size information, and acquire position information indicating the trajectory of the bottom face of the crawler belt 16 as work site terrain information. In this case, the work terrain information can be updated immediately. Alternatively, the work site terrain information may be generated from survey data measured by a surveying device outside the work vehicle 1. Aerial laser surveying may be used as an external surveying device, for example. In this case, the external surveying device is a terrain information acquisition device. Alternatively, the current terrain 50 may be photographed with a camera, and work site terrain information may be generated from the image data obtained by the camera. For example, aerial photographic surveying using a UAV (unmanned aerial vehicle) may be used. In this case, the image data processing system including the camera is a terrain information acquisition device. In the case of an external surveying device or a camera, the work site terrain information is updated at predetermined intervals, or whenever needed.

In step S104, the soil volume of the current terrain 50 is calculated. Here, the controller 26 calculates the soil volume of the current terrain 50 on the basis of the height of the current position. The controller 26 calculates the soil volume $S_{volume}$ of the current terrain 50 from the following formula (1).

$$S_{volume} = \sum_{k=1}^{n} \left| \frac{Z_{k-1} + Z_k}{2} - Z_0 \right| \qquad \text{Formula 1}$$

In this embodiment, the height of the current position is the height Z0 of the current terrain 50 located in the vertical direction of the current cutting edge position P0. However, the height of the current position may be different from the height Z0 of the current terrain 50 located in the vertical direction of the current cutting edge position P0. For example, the height of the current position may be the height of the current cutting edge position P0. Alternatively, the height of the current position may be the height of a perpendicular from the current cutting edge position P0 to the plane that includes the bottom face of the crawler 16.

In calculating the soil volume, it is assumed that the cross sectional area of the current terrain 50 in the travel direction of the work vehicle 1 corresponds to the soil volume, and the size of the current terrain 50 in the width direction of the work vehicle 1 is not taken into account. However, the soil volume may be calculated by taking into account the size of the current terrain 50 in the width direction of the work vehicle 1.

In step S105, it is determined whether a first starting condition is satisfied. The first starting condition includes the following conditions (1) and (2).

(1) The soil volume $S_{volume}$ of the current terrain 50 is equal to or greater than a predetermined undulation determination threshold $S_{const}$.

(2) The operating position of the operating device 25 is the forward position.

The controller 26 determines whether there are undulations in the current terrain 50 according to the first starting condition. Meeting the first starting condition means that the work vehicle 1 is moving forward and there is a terrain that can be worked in that forward direction. When the first starting condition is satisfied, the flow proceeds to step S106. When the first starting condition is not satisfied, the flow returns to step S101. The processing from step S101 to step S105 is repeated at predetermined intervals until the first starting condition is satisfied.

Figure 6:
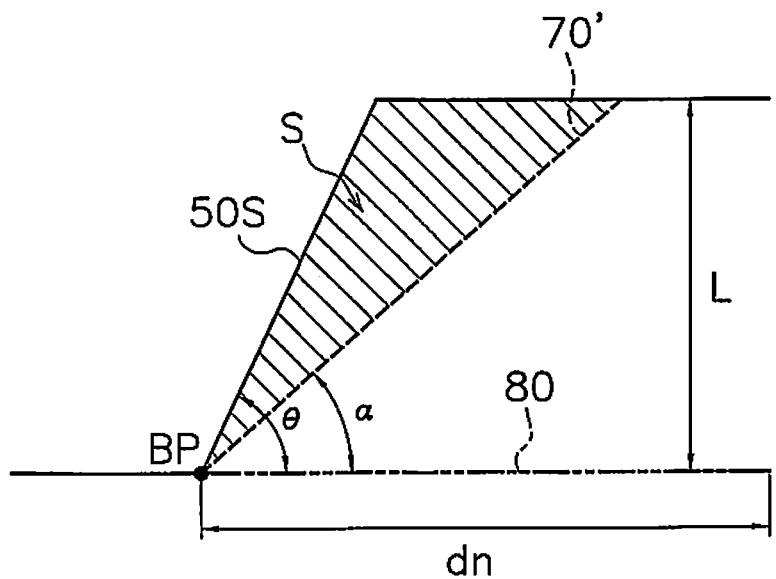
FIG. 6 is a diagram showing a method for calculating the inclination angle of the virtual design surface.

In step S106, the inclination angle α of a virtual surface 70' is calculated. The virtual surface 70' is a surface that substantially forms the virtual design surface when a predetermined condition is satisfied. The virtual design surface is a surface indicating the cutting edge target position of the work implement 13 during work by the work vehicle 1. The virtual design surface 70 includes a virtual surface inclined at an angle α. FIG. 6 illustrates the calculation of the inclination angle α. The virtual surface 70' is assumed for calculation of the inclination angle α to be located below the simplified current terrain 50S and inclined at an inclination angle α with respect to the horizontal direction. The baseline extending horizontally in FIG. 6 shows a horizontal plane 80 at the height of the current position of the work vehicle 1.

For example, the horizontal plane 80 has the height of the cutting edge P0 of the work implement 13 of the work vehicle 1. The virtual surface 70' is a straight line in a vertical plane including the travel direction of the work vehicle 1. The virtual surface 70 in the vertical plane may be a curved line. The simplified current terrain 50S is a terrain that approximates the current terrain 50 as a shelf shape. The simplified current terrain 50S includes a height L, an inclination angle θ, and a base point BP. The controller 26 decides the inclination angle α so that the soil volume of the simplified current terrain 50S located above the virtual surface 70' will be a predetermined target soil volume S. As shown in FIG. 6, the controller 26 decides the inclination angle α of the virtual surface 70' so that the cross sectional area of the simplified current terrain 50S located above the virtual surface 70' will be the target soil volume S.

More precisely, the controller 26 calculates the inclination angle α from the following formula (2).

$$\alpha = \frac{L^2 \cdot \theta}{L^2 + 2S|\theta|} \qquad \text{Formula 2}$$

L is the height of the undulations in the simplified current terrain 50S. For example, L may be the difference between the maximum and minimum values for the heights Z0 to Zn at a plurality of points in the above-mentioned current terrain 50. The target soil volume S may be decided on the basis of the capacity of the blade, for example.

θ is the inclination angle of the simplified current terrain 50S. The controller 26 decides the inclination angle θ of the simplified current terrain 50S from the above-mentioned current terrain information. Specifically, the inclination angle θ is the maximum value of the inclination angle at a plurality of points in the current terrain 50. Alternatively, the inclination angle θ may be the average value of the inclination angle at a plurality of points in the current terrain 50. Here, the inclination angle is the angle formed by the horizontal plane 80 and the extrapolation of a line segment connecting two points in the current terrain 50. The point at which the extrapolation of the current terrain having the maximum inclination angle (θ) intersects the horizontal plane 80 is the base point BP. The virtual surface 70' is assumed for the calculation of the inclination angle α to pass through the base point BP.

However, when the inclination angle α calculated from Formula 2 above is greater than a predetermined upper limit value $α_{max}$, the controller 26 sets the upper limit value $α_{max}$ as the inclination angle α. The upper limit value $α_{max}$ may be, for example, a value determined on the basis of the maximum digging angle of which the work vehicle 1 is capable.

Also, when the inclination angle α calculated from Formula 2 is less than a predetermined lower limit value $α_{min}$, the controller 26 sets the lower limit value $α_{min}$ as the inclination angle α. The lower limit value $α_{min}$ may be L/dn, for example, where dn is the above-mentioned terrain recognition distance. That is, the lower limit value $α_{min}$ may be the lower limit value of the inclination angle that can be attained by the virtual surface 70' within the terrain recognition distance dn from the current position to the top of the simplified current terrain 50S. In this embodiment, the inclination angle α is calculated from the simplified current terrain 50S and the target soil volume S, but the present invention is not limited to this. The inclination angle α may be calculated by sequential calculation from the horizontal plane 80, the current terrain 50, and the target soil volume S.

In step S107, the estimated held soil volume $S_{sum}$ is calculated. The estimated held soil volume $S_{sum}$ is an estimate of the soil volume held in the work implement 13 as a result of digging along the virtual surface 70' at the inclination angle α from the current position. The estimated held soil volume $S_{sum}$ is calculated on the basis of the estimated dug soil volume and current held soil volume. The virtual surface 70' is a virtual surface generated by the controller 26 and having the above-mentioned inclination angle α.

Figure 7:
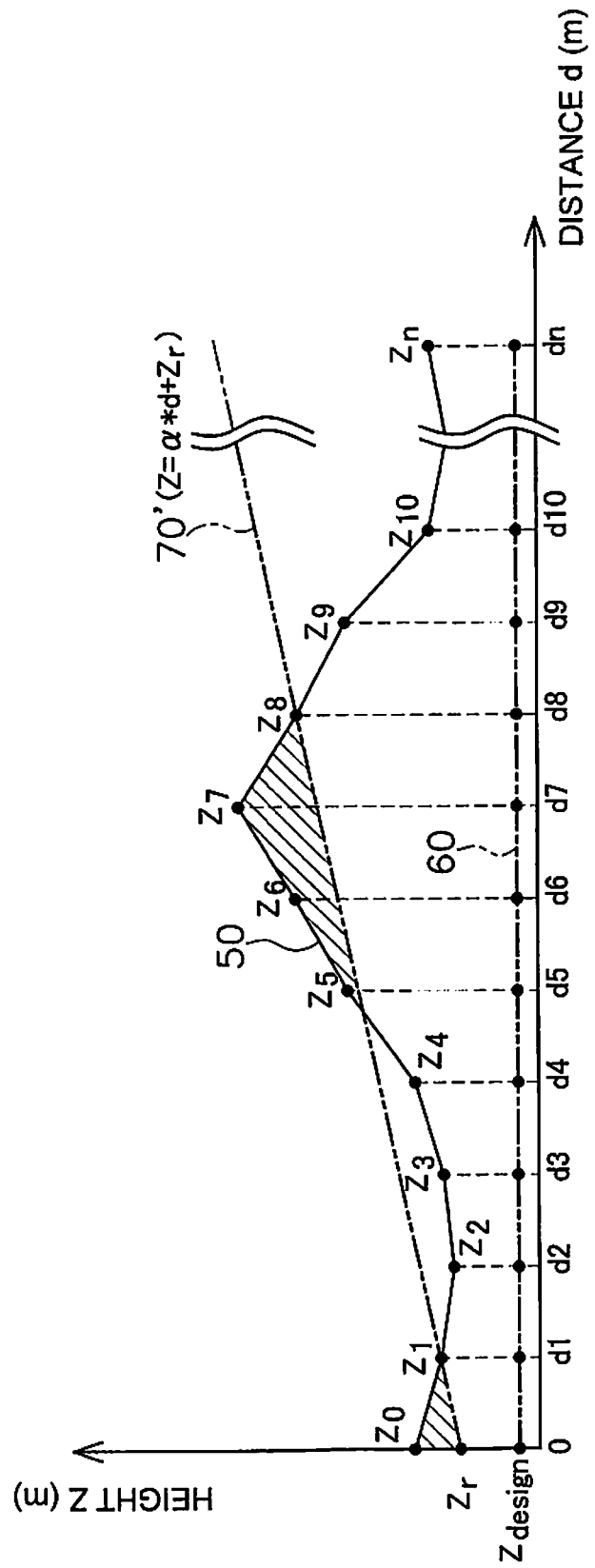
FIG. 7 is a diagram showing a method for calculating the estimated dug soil volume.

The estimated dug soil volume is an estimate of the soil volume dug up when the cutting edge of the work implement 13 is moved along the virtual surface 70' at the inclination angle α from the current position. More precisely, as shown in FIG. 7, the estimated dug soil volume is the cross sectional area of the current terrain 50 located above the virtual surface 70' at the inclination angle α extending from the current position Zr (the surface area of the hatched portion in FIG. 7).

The current position Zr may be the current cutting edge position P0. Or, it may be the position (Z0) of the current terrain 50 located in the vertical direction of the current cutting edge position P0. Alternatively, the current position Zr may be at the height of a perpendicular from the current edge position P0 to a plane that includes the bottom face of the crawler belt 16.

Figure 8:
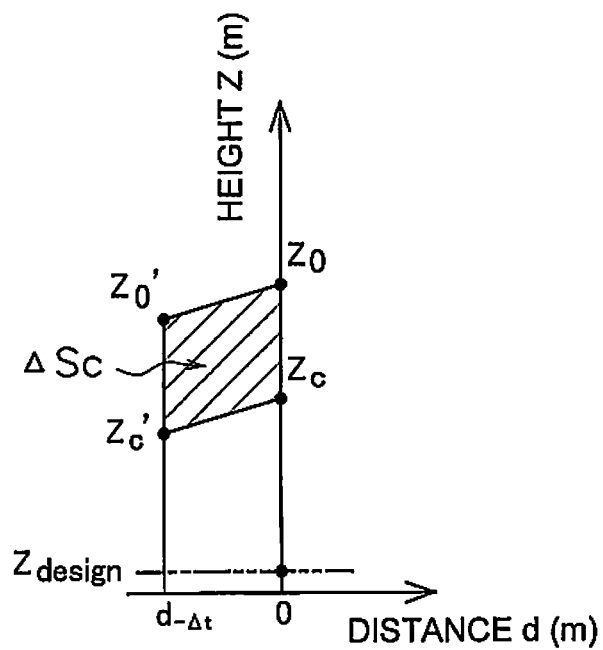
FIG. 8 is a diagram showing a method for calculating the current held soil volume.

The current held soil volume is the volume of soil currently being held by the work implement 13. The controller 26 calculates the current held soil volume on the basis of the difference between the current terrain 50 and the trajectory of the cutting edge position P0, for example. As shown in FIG. 8, the controller 26 calculates the cross sectional area ΔSc bounded by the height Z0' of the current terrain 50 a specific length of time Δt earlier, the height Z0 of the current terrain 50 at the current position, the height Zc' of the cutting edge position P0 a specific length of time Δt earlier, and the height Zc of the current edge position P0. The controller 26 then calculates the value obtained by adding up the ΔSc value calculated at predetermined time intervals Δt, as the current held soil volume. The controller 26 calculates the sum of the estimated dug soil volume and the current held soil volume as the estimated held soil volume $S_{sum}$.

The current held soil volume may be calculated from the traction of the work vehicle 1. For example, if the work vehicle 1 is equipped with an HST, the traction force may be calculated from the hydraulic pressure supplied to the hydraulic motor of the HST, and the current held soil volume may be calculated from the calculated traction force. Alternatively, image information about the soil being carried by the working implement 13 may be acquired by a camera, and the controller 26 may calculate the current held soil volume from the acquired image information.

In step S108, it is determined whether a second starting condition is satisfied. The second starting condition includes the following condition (3).

$$q1 \cdot S < S_{sum} \quad (3)$$

Here, symbol q1 is a predetermined constant. The symbol q1 is a value less than 1. The symbol q1 is a value close to 1, such as a value of about 0.9. S is the above-mentioned target soil volume. Therefore, the condition (3) means that the estimated held soil volume $S_{sum}$ has increased from a value that is less than the target soil volume S, and has reached a first held soil volume threshold (q1·S) determined from the target soil volume S.

Figure 9:
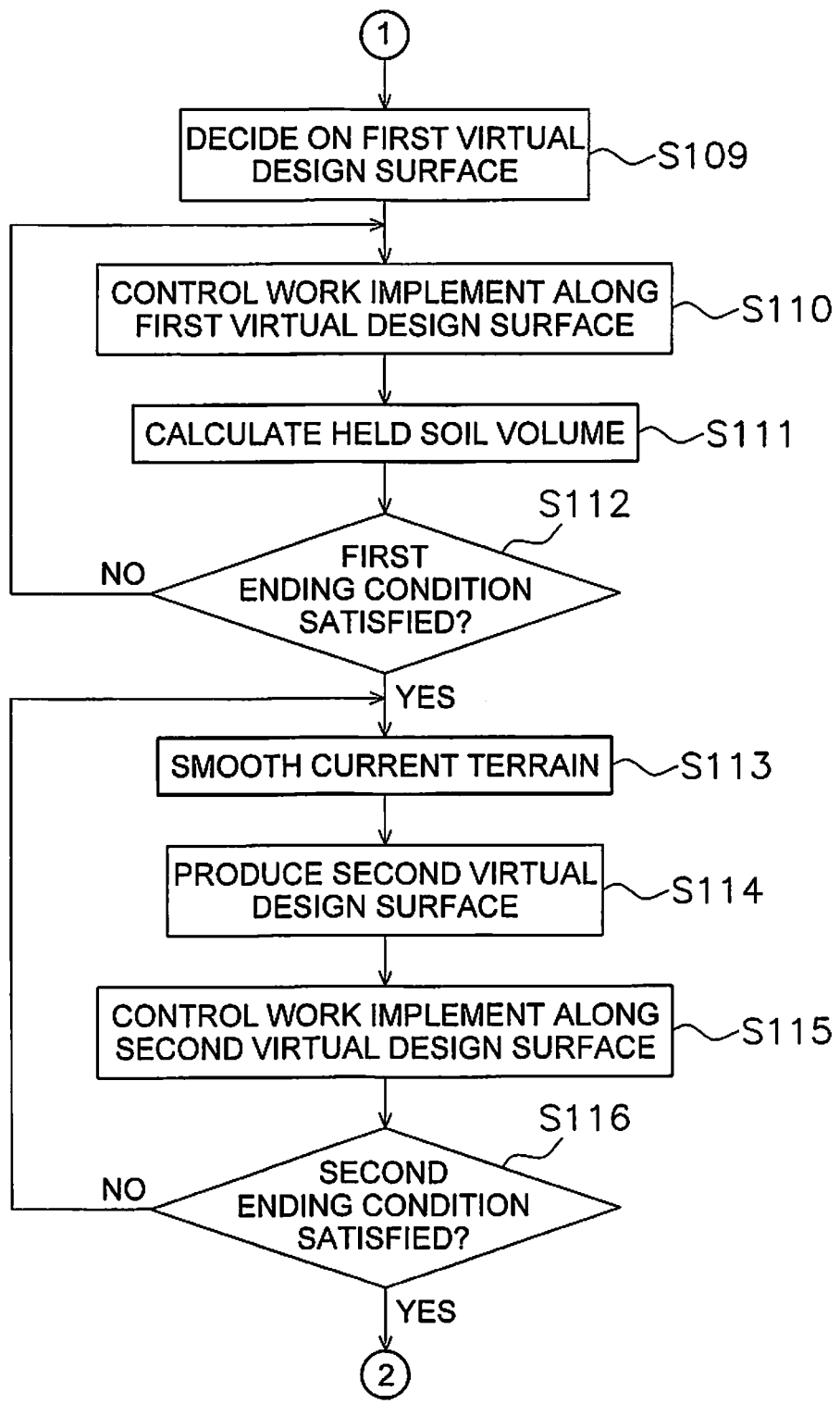
FIG. 9 is a flowchart showing the processing involved in automatic control of the work implement in digging work.

When the second starting condition is satisfied, the flow proceeds to step S109 shown in FIG. 9. When the second starting condition is not satisfied, the flow returns to step S106. The processing from step S106 to step S108 is repeated at predetermined intervals until the second starting condition is satisfied. While this processing is being repeated, the work vehicle 1 travels and moves. The virtual surface 70' is a plane extending obliquely from the work vehicle 1 in the travel direction of the work vehicle 1. The virtual surface 70' is set using the current position Zr as the base point. For example, the virtual surface 70' is set using the cutting edge position P0 at the distal end of the work implement 13 of the work vehicle 1 as a base point. The position or travel direction of the work vehicle 1 is changed by turning or travel of the work vehicle 1 until the second starting condition is satisfied by the virtual surface 70' with the set inclination angle α.

Figure 10:
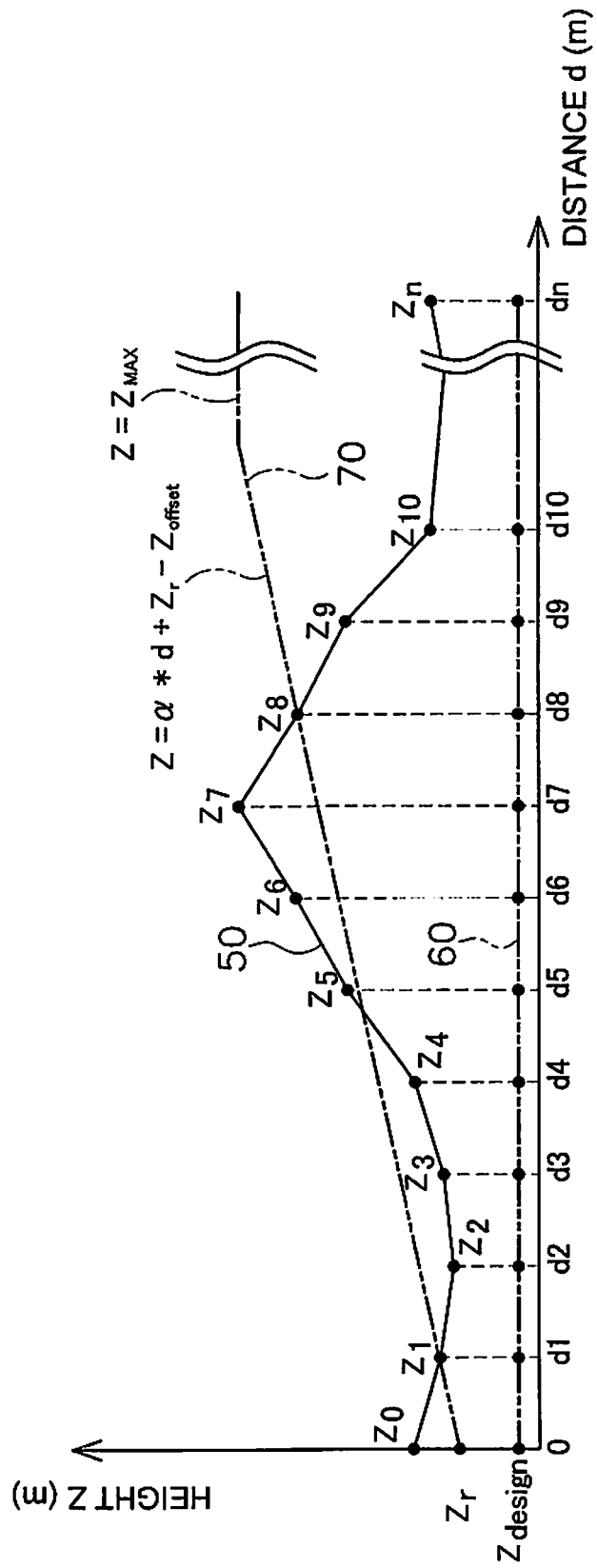
FIG. 10 is a diagram showing an example of a virtual design surface in digging work.

In step S109, an inclined first virtual design surface 70 is produced. The first virtual design surface 70 is the virtual surface 70' when the second starting condition is satisfied. Here, as shown in FIG. 10, the controller 26 produces a first virtual design surface 70 having an inclination angle α and extending from the current position Zr in the travel direction of the work vehicle 1. However, if the inclined first virtual design surface 70 is equal to or greater than a maximum height $Z_{max}$, the controller 26 produces a first virtual design surface 70 that extends horizontally at the maximum height $Z_{max}$.

For the width direction of the work vehicle 1, the virtual design surface shall be assumed to extend in the horizontal direction. $Z_{offset}$ in FIG. 10 is a predetermined offset height. The offset height $Z_{offset}$ may be zero.

In step S110, the work implement 13 is controlled along the first virtual design surface 70, which is the virtual surface 70' when the second starting condition is satisfied. Here, the controller 26 generates a command signal to the work implement 13 so that the cutting edge position of the work implement 13 will move along the first virtual design surface 70 produced in step S109. The generated command signal is inputted to the control valve 27. Consequently, as the cutting edge position P0 of the work implement 13 moves along the first virtual design surface 70, digging work is performed on the current terrain 50. The movement of the work implement 13 along the first virtual design surface 70 is started when the second starting condition is satisfied. Depending on the load borne by the work implement 13 and other such effects, the work implement 13 may not always be able to move as instructed by the command signal, but to simplify the description, let us assume that the work implement 13 moves along the virtual design surface 70 in response to the command signal.

In step S111 the held soil volume $S_{held}$ is calculated. Here, the controller 26 calculates the held soil volume $S_{held}$ in the same manner as in the method for calculating the held soil volume given above.

In step S112, it is determined whether a first ending condition is satisfied. The first ending condition includes that the held soil volume $S_{held}$ calculated in step S111 is greater than a predetermined end determination threshold. The end determination threshold may be the above-mentioned target soil volume S. Or, the end determination threshold may be determined from the above-mentioned target soil volume S. When the first ending condition is satisfied, the flow proceeds to step S113.

The first ending condition may include that the height Z0 of the current terrain 50 at the current position has gone over a predetermined target height $Z_{target}$. The target height $Z_{target}$ is the height of the virtual design surface 70 at the position where a value oft times the estimated held soil volume $S_{sum}$ calculated in step S107 is first exceeded when the estimated held soil volumes of the work implement 13 are successively added up from the current position. Symbol t is a predetermined constant, and is a value less than 1. The symbol t is a value close to 1, such as a value of about 0.95.

When the first ending condition is not satisfied the flow returns to step S110. Until the first ending condition is satisfied, the processing from step S110 to step S112 is repeated at predetermined intervals.

In step S113, smoothing of the current terrain 50 is performed. The term smoothing means processing to smooth out the height changes in the current terrain 50. Here, the controller 26 smoothes the heights Z0 to Zn at a plurality of points in current terrain 50 according to the following formula (3).

$$Z_{n\_sm} = (\Sigma_{k=n-2}^{n+2} Z_k)/5 \qquad \text{Formula 3}$$

Figure 11:
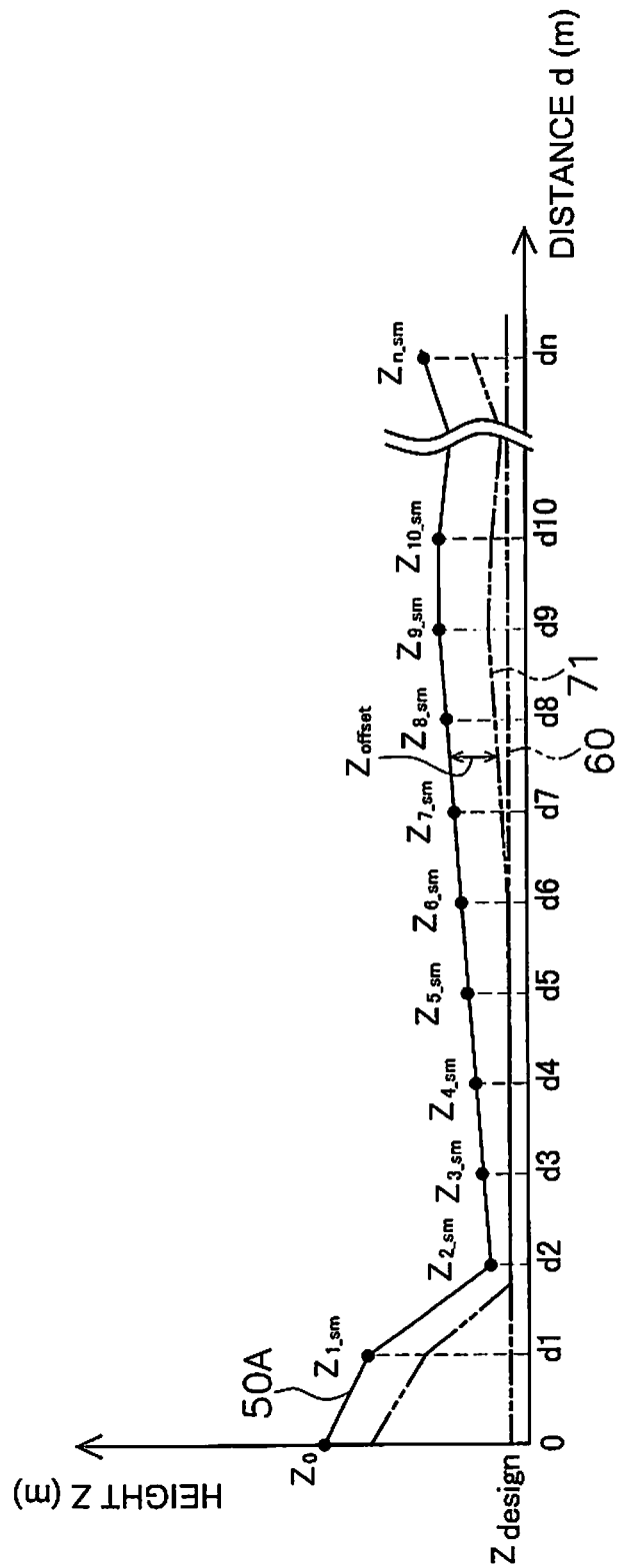
FIG. 11 is a diagram showing an example of a virtual design surface in earthmoving work.

All the heights at a plurality of points of the current terrain 50 were smoothed in this embodiment, but smoothing of the height Z0 of the current terrain 50 at the current position may not be performed. In that case, for Z1, the average value for Z0, Z1, and Z2 is used as the smoothed value of Z1. FIG. 11 shows the smoothed current terrain 50A. In FIG. 11, $Z1\_sm$ to $Zn\_sm$ indicate the heights of the smoothed current terrain 50A.

In Formula 3, smoothing is performed with the average height at five points, but the number of points used in the smoothing may be less than five, or may be greater than five. Also, what is calculated is not limited to the average value of the height of the points to be smoothed and points ahead and behind, and may also be the average value of the height of the points to be smoothed and points located in front. Alternatively, the average value of the height of the points to be smoothed and points located behind may be calculated. Or, some other smoothing processing may be used, and not just the average value.

In step S114 a virtual design surface that follows along the current terrain 50 is produced. Here, the controller 26 produces a second virtual design surface 71 along the smoothed current terrain 50A. More precisely, as shown in FIG. 11, the controller 26 produces a second virtual design surface 71 in which the smoothed current terrain 50A has been moved downward by a predetermined offset amount $Z_{offset}$. However, the second virtual design surface 71 is set so as not to go below a final design terrain 60.

In step S115, the work implement 13 is controlled along the second virtual design surface 71. Here, the controller 26 generates a command signal to the work implement 13 so that the cutting edge position P0 of the work implement 13 will move along the second virtual design surface 71 produced in step S114. The generated command signal is inputted to the control valve 27. Consequently, the cutting edge position P0 of the work implement 13 moves along the second virtual design surface 71 to carry out earthmoving work.

The above-mentioned offset amount $Z_{offset}$ is set to press the blade against the current terrain 50 during earthmoving work and decrease the soil volume that leaks from the work implement 13. The offset amount $Z_{offset}$ may be zero.

In step S116, it is determined whether a second ending condition is satisfied. The second ending condition includes that the work vehicle 1 has reversed by at least specific distance. When the second ending condition is satisfied, the above-mentioned held soil volume $S_{held}$ is reset, and the flow returns to step S101.

If the second ending condition has not been satisfied, the flow returns to step S113. The processing from step S113 to step S116 is repeated at predetermined intervals until the second ending condition is satisfied.

Figure 12A:
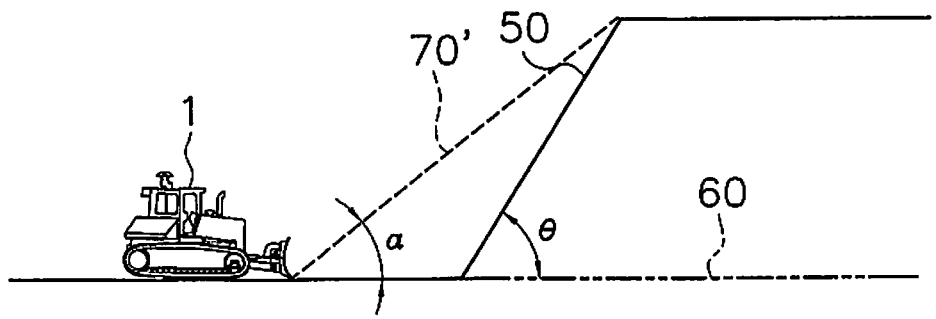
FIGS. 12A-12C are diagrams showing an example of work done by a work vehicle on an upward slope.

As described above, with the control system 3 for the work vehicle 1 according to this embodiment, as shown in FIG. 12A, the controller 26 determines whether there are undulations having a soil volume equal to or greater than a predetermined undulation determination threshold $S_{const}$ in the current terrain 50 ahead of the work vehicle 1. If there are such undulations in front of the work vehicle 1, that is, when the first starting condition is satisfied, the controller 26 produces a virtual surface 70' extending at an inclination angle α from the current position of the work vehicle 1. The inclination angle α of the virtual surface 70' is less than the inclination angle θ of the current terrain 50.

Figure 12B:
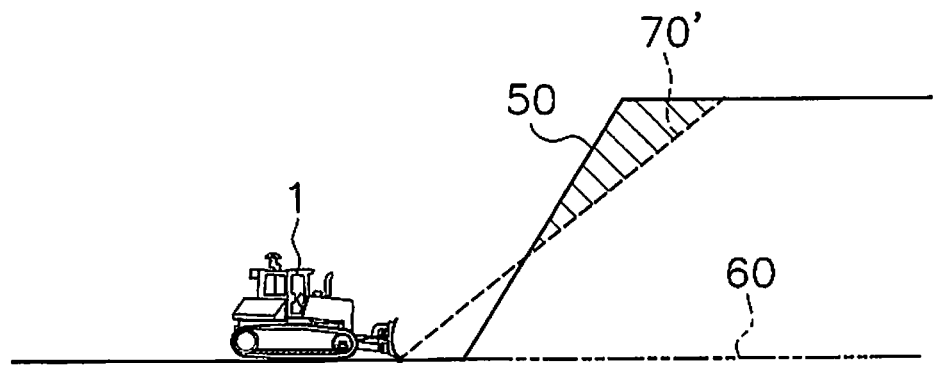
Figure 12C:
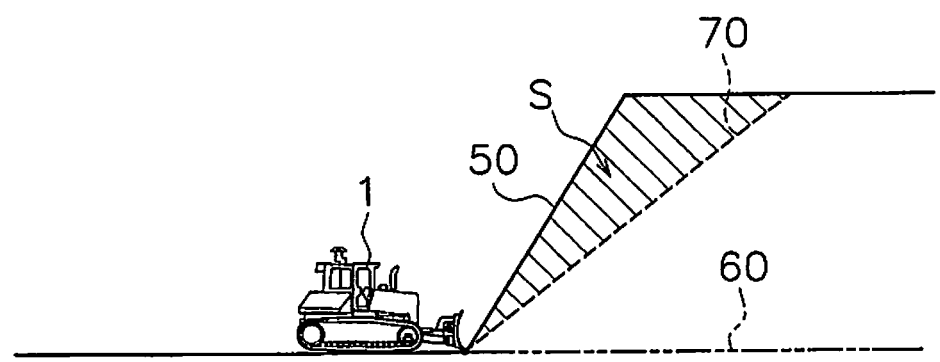

Next, FIG. 12B shows a state in which the work vehicle 1 has moved from the position in FIG. 12A to a position close to the current terrain 50. As shown in FIG. 12B, the controller 26 calculates the estimated held soil volume (the sum of the surface area of the hatched portion in FIG. 12B and the current held soil volume) on the basis of the virtual surface 70'. The controller 26 then determines whether the estimated held soil volume matches the target soil volume S. FIG. 12C shows a state in which the work vehicle 1 has moved from the position in FIG. 12B to a position even closer to the current terrain 50. As shown in FIG. 12C, if the estimated held soil volume approximately matches the target soil volume S, that is, when the second starting condition is satisfied, the controller 26 recognizes the design surface 70' as the first virtual design surface 70, and controls the work implement 13 so that the work implement 13 will move along the inclined first virtual design surface 70. As a result, digging work is performed on the current terrain 50.

FIGS. 12A-12C show the current terrain 50 as a simplified contour. In FIGS. 12A and 12C, the virtual (design) surface is depicted in unique positions with respect to the current terrain 50 in order to simplify the drawings, but the position of the virtual (design) surface corresponding to the above description is not limited to these unique locations. For example, in FIG. 12C showing the start of the work operation, the work implement 13 may be separated from the ground surface.

Figure 13A:
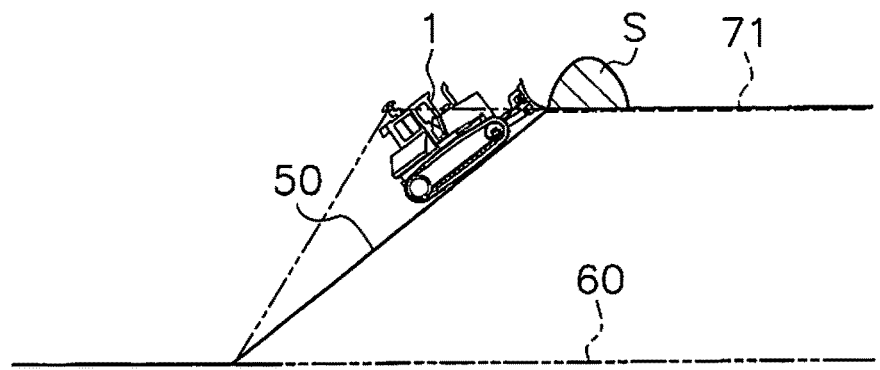
FIGS. 13A, 13B and 13C are diagrams showing an example of work done by a work vehicle on an upward slope.
Figure 13B:
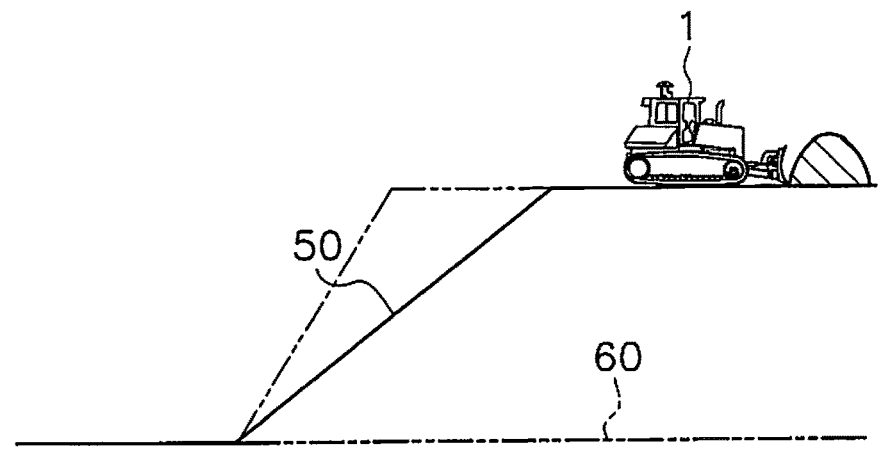

Next, as shown in FIG. 13A, when the held soil volume $S_{held}$ of the work implement 13 becomes greater than the target soil volume S, or when the height Z0 of the current terrain 50 at the current position has reached the target height $Z_{target}$, the controller 26 produces the second virtual design surface 71 that follows along the current terrain 50. The controller 26 then controls the work implement 13 so that the work implement 13 will move along the second virtual design surface 71 that follows the current terrain 50. Consequently, earthmoving work is performed as shown in FIG. 13B.

Figure 13C:
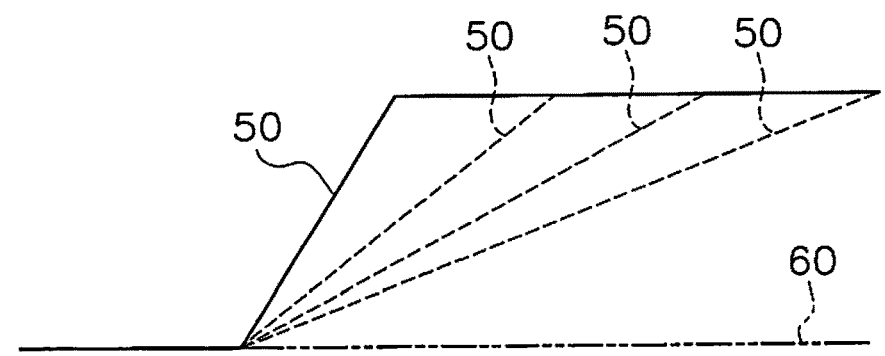

When the work vehicle 1 reverses by at least a specific distance, the held soil volume $S_{held}$ of the work implement 13 is reset. Then, the work shown in FIGS. 12A to 12C and FIGS. 13A to 13B is repeated. When performing repetitive tasks at the same work site, the work site terrain information can be updated instantly with vehicle position information for the work vehicle 1 obtained from the position sensing device 31. In this case, the position sensing device 31 functions as a terrain information acquisition device. The controller 26 updates the current terrain 50 on the basis of the updated work site terrain information, and newly decides on the virtual design surfaces 70 and 71 based on the updated current terrain 50. Consequently, the first virtual design surface 70 is determined so that at a given work site (as shown in FIG. 13C), the inclination angle α will gradually decrease. As a result, as shown in FIG. 13C, the inclination of the current terrain 50 gradually becomes less steep, and digging is performed so as to approach the final design terrain 60.

An embodiment of the present invention was described above, but the present invention is not limited to or by the above embodiment, and various modifications are possible without departing from the gist of the invention.

The work vehicle 1 is not limited to a bulldozer, and may be some other vehicle such as a wheel loader.

The work vehicle 1 may also be a vehicle that can be steered remotely. In that case, part of the control system 3 may be located outside of the work vehicle 1. For example, the controller 26 may be located outside of the work vehicle 1. The controller 26 may be disposed in a control center that is away from the work site.

The operating device 25 may be disposed outside of the work vehicle 1. In that case, the cab may be omitted from the work vehicle 1. Alternatively, the operating device 25 may be omitted from the work vehicle 1. The work vehicle 1 may be operated by automatic control under the controller 26 alone, without any input from the operating device 25.

The controller 26 may have a plurality of controllers separate from one another. For example, the controller 26 may include a remote controller disposed outside of the work vehicle 1 and an onboard controller installed in the work vehicle 1. The remote controller and the onboard controller may be capable of communicating wirelessly. Some of the functions of the controller 26 discussed above may be executed by the remote controller, and the rest by the onboard controller. For example, processing for determining the virtual design surface may be executed by the remote controller, and processing for outputting a command signal to the work implement may be performed by the onboard controller.

In the above embodiment, the controller 26 produced the second virtual design surface 71 that followed along the current terrain 50 on the basis of the smoothed current terrain 50A. However, the controller 26 may produce the second virtual design surface 71 that follows the current terrain 50 without any smoothing being performed.

Figure 14A:
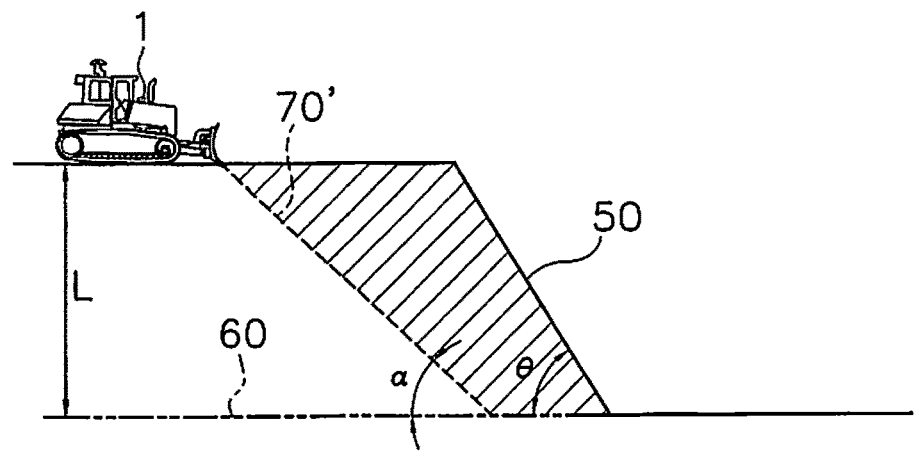
FIGS. 14A, 14B and 14C are diagrams showing an example of work done by a work vehicle on a downward slope.

In the above embodiment, a scenario of digging uphill was described, but digging work under the same control as above may be performed for a downward slope as shown in FIG. 14A. In this case, the inclination angle α of the first virtual design surface 70 can be similarly calculated using Formula 2 given above.

Figure 14B:
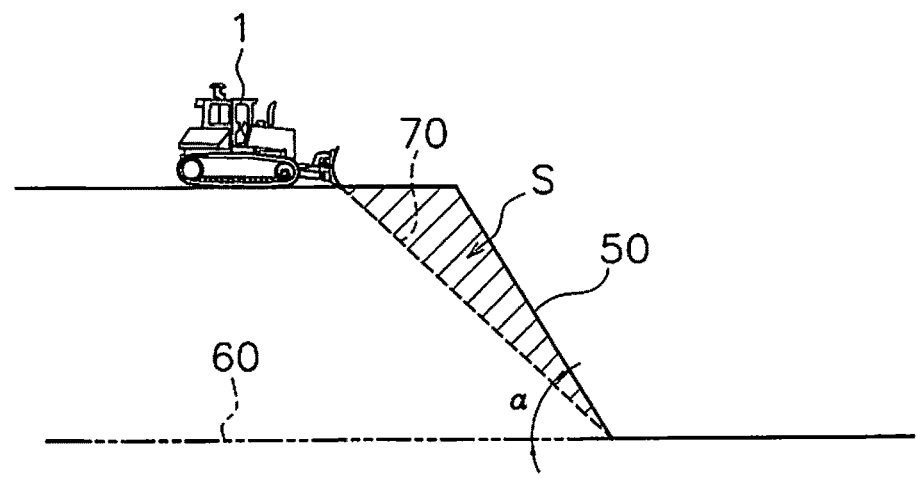

With a downward inclination, the surface area that is hatched in FIG. 14A may be calculated as the estimated dug soil volume discussed above. The held soil volume may be decided in the same way as the held soil volume discussed above. As shown in FIG. 14B, the controller 26 may control the work implement 13 so that the work implement 13 moves along the inclined virtual design surface 70 when the estimated held soil volume $S_{sum}$ that combines the estimated dug soil volume with the held soil volume approximately matches the target soil volume S. In this case, the second starting condition preferably includes the following condition (4).

$$S_{sum} < q2 \cdot S \quad (4)$$

Symbol q2 is a predetermined constant. The symbol q2 is a value greater than 1. The symbol q2 is a value close to 1, such as a value of about 1.1. Therefore, condition 4 means that the estimated held soil volume $S_{sum}$ has reached the second held soil volume threshold (q2·S) determined from the target soil volume S.

More specifically, condition 4 means that the estimated held soil volume $S_{sum}$ has decreased from a soil volume that exceeds the target soil volume S, and has reached a value close to the target soil volume S (the second held soil volume threshold (q2·S)). The above-mentioned condition 3 means that the estimated held soil volume $S_{sum}$ has increased from a soil volume that is less than the target soil volume S, and has reached a value close to the target soil volume S (the first held soil volume threshold (q1·S)).

Figure 14C:
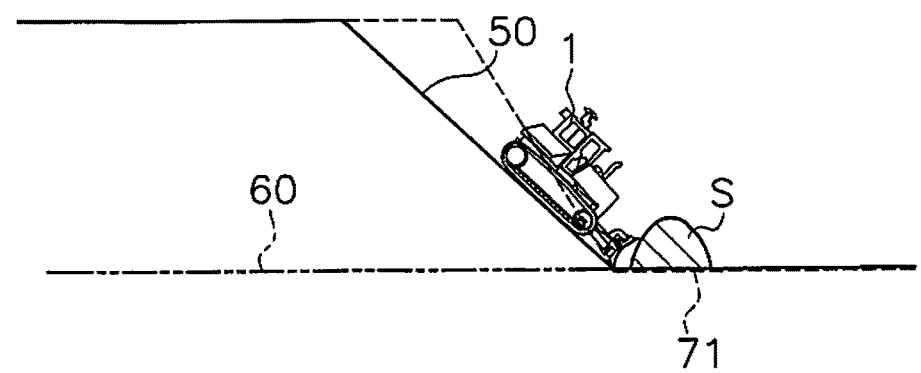
Figure 15:
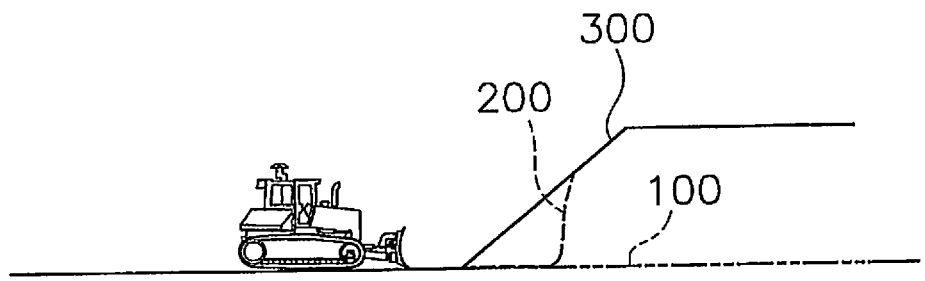
FIG. 15 is a diagram showing digging work according to prior art.

As shown in FIG. 14C, if the held soil volume $S_{held}$ of the work implement 13 is greater than the target soil volume S, or if the height Z0 of the current terrain 50 at the current position has reached the target height $Z_{target}$, the controller 26 may produce a second virtual design surface 71 that follows along the current terrain 50. The controller 26 may then control the work implement 13 so that the cutting edge position P0 of the work implement 13 moves along the second virtual design surface 71 that follows the current terrain 50.

The invention claimed is:

1. A control system for a work vehicle, the system comprising:
    a current terrain acquisition device that acquires current terrain information indicating a current terrain to be worked; and
    a controller configured to
        generate an inclined virtual surface extending from a current cutting edge position of the work vehicle,
        decide an estimated held soil volume of a work implement of the work vehicle when the work implement is moved along the virtual surface in the current terrain,
        decide whether the estimated held soil volume reaches a predetermined held soil volume threshold, and
        set the virtual surface extending from the current cutting edge position of the work vehicle when the estimated held soil volume reaches the held soil volume threshold as a first virtual design surface, and generate a command signal to the work implement to move the work implement along the first virtual design surface,
    the held soil volume threshold when the current terrain is an uphill slope being different from the held soil volume threshold when the current terrain is a downhill slope, and when the current terrain is an uphill slope, the controller being configured to generate a command signal to the work implement to move the work implement along the first virtual design surface extending from the current cutting edge position of the work vehicle when the estimated held soil volume becomes greater than a first held soil volume threshold.

2. The control system for a work vehicle according to claim 1, wherein
    when the current terrain is a downhill slope, the controller is configured to generate a command signal to the work implement to move the work implement along the first virtual design surface extending from the current cutting edge position of the work vehicle when the estimated held soil volume become less than a second held soil volume threshold.

3. The control system for a work vehicle according to claim 1, wherein
the controller is further configured to
determine from the current terrain information whether there is an undulation in the current terrain, and
calculate an inclination angle of the first virtual design surface when a starting condition is satisfied, the starting condition including that the current terrain is determined to have an undulation.

4. The control system for a work vehicle according to claim 3, wherein
the controller is further configured to
decide a soil volume of the current terrain based on a height of the current cutting edge position of the work vehicle, and
determine that there is an undulation in the current terrain when the soil volume of the current terrain is equal to or greater than a predetermined undulation determination threshold.

5. The control system for a work vehicle according to claim 3, wherein
the starting condition further includes that the controller receives a signal to move the work vehicle forward.

6. The control system for a work vehicle according to claim 1, wherein
the controller is configured to
decide a current held soil volume of the work implement, and
end control of the work implement by the first virtual design surface when an ending condition is satisfied, the ending condition including that the current held soil volume is greater than a predetermined ending determination threshold.

7. A control system for a work vehicle, the system comprising:
a current terrain acquisition device that acquires current terrain information indicating a current terrain to be worked; and
a controller configured to
generate an inclined virtual surface extending from a current cutting edge position of the work vehicle,
decide an estimated held soil volume of a work implement of the work vehicle when the work implement is moved along the virtual surface in the current terrain,
decide whether the estimated held soil volume reaches a predetermined held soil volume threshold, and
set the virtual surface extending from the current cutting edge position of the work vehicle when the estimated held soil volume reaches the held soil volume threshold as a first virtual design surface, and generate a command signal to the work implement to move the work implement along the first virtual design surface,
the controller being further configured to
decide a current held soil volume of the work implement,
end control of the work implement by the first virtual design surface when an ending condition is satisfied, the ending condition including that the current held soil volume is greater than a predetermined ending determination threshold,
decide a second virtual design surface that follows along the current terrain, when the ending condition is satisfied, and
generate a command signal to the work implement to move the work implement along the second virtual design surface that follows the current terrain.

8. The control system for a work vehicle according to claim 7, wherein
the second virtual design surface is a surface which is moved downward a specific amount from a terrain obtained by smoothing the height of the current terrain.

9. A method for controlling a work vehicle, the method comprising:
acquiring current terrain information indicating a current terrain to be worked;
acquiring a current cutting edge position of the work vehicle;
generating an inclined virtual surface extending from the current cutting edge position of the work vehicle;
deciding an estimated held soil volume of a work implement of the work vehicle when the work implement is moved along the virtual surface;
repeatedly generating the virtual surface and deciding the estimated held soil volume while moving the work vehicle, and determining whether the estimated held soil volume reaches a predetermined held soil volume threshold; and
setting the virtual surface at a position of the work vehicle when the estimated held soil volume reaches the held soil volume threshold as a virtual design surface and starting movement of the work implement along the virtual design surface,
the held soil volume threshold when the current terrain is an uphill slope being different from the held soil volume threshold when the current terrain is a downhill slope, and when the current terrain is an uphill slope, the controller being configured to generate a command signal to the work implement to move the work implement along the first virtual design surface extending from the current cutting edge position of the work vehicle when the estimated held soil volume becomes greater than a first held soil volume threshold.

10. A work vehicle comprising:
a work implement; and
a controller configured to
decide an inclined virtual surface extending from a current cutting edge position of the work vehicle,
decide an estimated held soil volume of the work implement when the work implement is moved along the virtual surface in a current terrain to be worked, and
set the virtual surface extending from the current cutting edge position of the work vehicle when the estimated held soil volume reaches a predetermined held soil volume threshold as a virtual design surface and move the work implement along the virtual design surface,
the held soil volume threshold when the current terrain is an uphill slope being different from the held soil volume threshold when the current terrain is a downhill slope, and when the current terrain is an uphill slope, the controller being configured to generate a command signal to the work implement to move the work implement along the virtual design surface extending from the current cutting edge position of the work vehicle when the estimated held soil volume becomes greater than a first held soil volume threshold.

11. The work vehicle according to claim 10, wherein
the current terrain to be worked is a terrain of a region that follows along a travel direction of the work vehicle from the current cutting edge position of the work vehicle.

12. The work vehicle according to claim 10, further comprising
a position sensing device that senses a position and a travel direction of the work vehicle and outputs position information and travel direction information about the work vehicle to the controller,
the current terrain is decided based on the position information and the travel direction information.

13. A method for controlling a work vehicle, the method comprising:
acquiring current terrain information indicating a current terrain to be worked;
acquiring a current cutting edge position of the work vehicle;
generating an inclined virtual surface extending from the current cutting edge position of the work vehicle;
deciding an estimated held soil volume of a work implement of the work vehicle when the work implement is moved along the virtual surface;
repeatedly generating the virtual surface and deciding the estimated held soil volume while moving the work vehicle, and determining whether the estimated held soil volume reaches a predetermined held soil volume threshold;
setting the virtual surface at a position of the work vehicle when the estimated held soil volume reaches the held soil volume threshold as a virtual design surface and starting movement of the work implement along the virtual design surface;
deciding a current held soil volume of the work implement,
ending control of the work implement by the first virtual design surface when an ending condition is satisfied, the ending condition including that the current held soil volume is greater than a predetermined ending determination threshold,
deciding a second virtual design surface that follows along the current terrain, when the ending condition is satisfied, and
generating a command signal to the work implement to move the work implement along the second virtual design surface that follows the current terrain.

14. A work vehicle comprising:
a work implement; and
a controller configured to
decide an inclined virtual surface extending from a current cutting edge position of the work vehicle,
decide an estimated held soil volume of the work implement when the work implement is moved along the virtual surface in a current terrain to be worked,
set the virtual surface extending from the current cutting edge position of the work vehicle when the estimated held soil volume reaches a predetermined held soil volume threshold as a virtual design surface and move the work implement along the virtual design surface,
decide a current held soil volume of the work implement,
end control of the work implement by the first virtual design surface when an ending condition is satisfied, the ending condition including that the current held soil volume is greater than a predetermined ending determination threshold,
decide a second virtual design surface that follows along the current terrain, when the ending condition is satisfied, and
generate a command signal to the work implement to move the work implement along the second virtual design surface that follows the current terrain.

* * * * *